Aug. 22, 1961 R. M. LELIAERT 2,996,846
METHOD AND MEANS FOR DEFLASHING OR TRIMMING MOLDED RUBBER PARTS
Filed July 29, 1959 2 Sheets-Sheet 1

INVENTOR.
Raymond M. Leliaert
BY
Bean, Brooks, Buckley & Bean

Aug. 22, 1961     R. M. LELIAERT     2,996,846
METHOD AND MEANS FOR DEFLASHING OR TRIMMING MOLDED RUBBER PARTS
Filed July 29, 1959     2 Sheets-Sheet 2
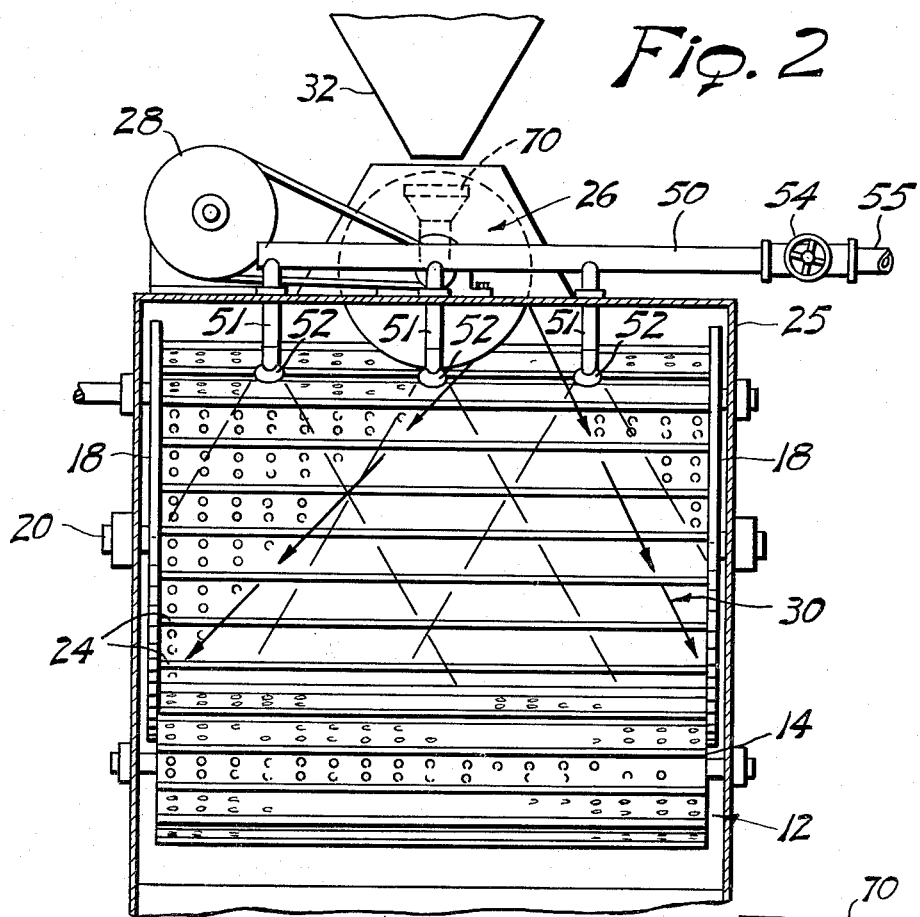
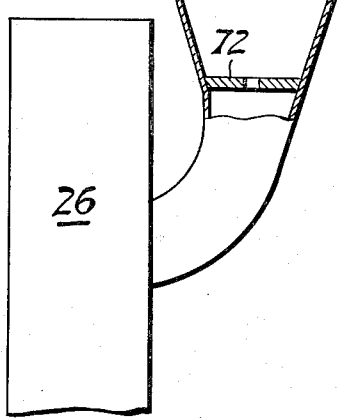
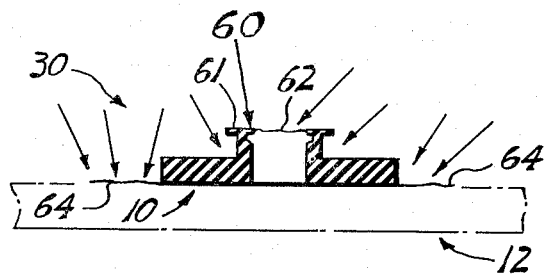
INVENTOR.
Raymond M. Leliaert
BY
Beau, Brooks, Buckley & Beau.

United States Patent Office 2,996,846
Patented Aug. 22, 1961

2,996,846
METHOD AND MEANS FOR DEFLASHING OR TRIMMING MOLDED RUBBER PARTS
Raymond M. Leliaert, South Bend, Ind., assignor, by mesne assignments, to Bell Intercontinental Corporation, South Bend, Ind., a corporation of Delaware
Filed July 29, 1959, Ser. No. 830,393
12 Claims. (Cl. 51—13)

This invention relates to methods and means for removing flashings and fins or the like or otherwise trimming molded rubber parts; and more particularly to improvements in methods and machines for such purposes using the technique of first "freezing" the parts so as to render the flash or fins brittle and therefore susceptible to a flashing or fin removing operation.

Previously, rubber molded parts have in some cases been subjected to conventional freezing and tumbling barrel type processes with a view to thereby knocking off the embrittled fins and flashings; but in many cases without satisfactory results, depending upon the nature of the workpieces being operated upon. For example, in many cases the workpieces include certain areas which are not assessible to the abrasive action of a conventional tumbling barrel operation. This is because in connection with a tumbling process the abrasive media must be of certain size and mass to be effective, and often the media would then be too large to satisfactorily remove flash and fins from certain areas of complex shaped parts. Furthermore, tumbling barrel techniques as applied to frozen rubber parts for deflashing purposes usually result in freezing throughout of the rubber parts, because of the length of time required to completely deflash by tumbling methods. Thus, such methods involve the disadvantages of unnecessarily expensive freezing gas consumption and machine time, and incidental development of stress cracks or other damage effects in the frozen parts. Many types of molded rubber parts are not adapted to be processed by conventional freeze-tumbling methods, because such methods usually embrittle and render relatively fragile certain portions of the parts such as projecting portions and edge portions of the workpieces thereby subjecting them to unwanted abrading and chipping off, or the like. Thus, it will be appreciated that conventional freeze-tumbling operations on frozen molded rubber parts for definning and deflashing purposes or the like are in many cases totally impracticable and useless.

It is an object of the present invention to provide a novel method and apparatus for differentially freezing the flashing or fin and main body portions of molded rubber parts; to handle such parts in novel and improved manner during the operation; and to subject the parts to a novel and improved abrading operation gaining access to heretofore inaccessible portions of the parts, and removing flash and fin portions completely and cleanly without damage to other portions of the rubber parts.

Another object is to provide an improved method and apparatus as aforesaid which will broaden the practical scope of application of the freeze-definning and deflashing technique; and which will be operable upon parts which previously, due to their design and construction, were not susceptible to freeze-tumbling methods and therefore were necessarily finished by relatively expensive individual hand operations.

Another object of the present invention is to provide an improved method and apparatus as aforesaid which is more economical in its use of the freezing media, compared to processes of the prior art, whereby substantial economies in the overall operation are effected.

Another object is to provide an improved method as aforesaid which is operable with increased speed and whereby improved utilization of the equipment and higher output rates and economies in the use of attendant labor are effected.

Other objects and advantages will appear from the specification hereinafter.

Generally stated, the present invention contemplates an operating technique involving flash-freezing of the molded rubber parts to be definned or deflashed etc., so that preferably only the relatively thin flashing or fin portions or the like extending from the parts become embrittled, while the molded body parts remain substantially unfrozen; and then projecting against the parts an airless blast of abrasive media moving at such velocity as to break off the hardened brittle fins or flashings, but not at such velocity as to cause rounding of the edges or other damage to other portions of the workpieces. During this operation in some cases the workpieces will be constantly turned, but in other cases they may be otherwise disposed and conveyed in their frozen state while the abrasive blast directing devices are arranged to project the abrasive media against and into all desired portions of the workpieces. The abrasive media is selected as to size so as to be adapted to readily gain access into recessed portions of the workpieces, such as would not be reached in conventional freeze-tumbling operations or the like.

Furthermore, the invention contemplates, generally, provision of an apparatus such as will be adapted to relatively quickly differentlly freeze the undesirable flash or fin portions of the workpieces without substantial freezing of the relatively thicker body parts; presenting the differentially frozen workpieces to abrasive media airless blasts, while presenting the workpieces to expose the desired portions thereof; abstracting from the operation the finer flash and fin pieces as well as the spent abrasive media, and separating from the mixture any reusable abrasive media; and returning it to the blasting operation without substantial inlet of relatively warm and/or moisture laden atmosphere. By way of one example of performance of the method of the invention, and of an apparatus by which the invention may be practiced, a machine constructed in accord therewith is illustrated by the accompanying drawings wherein;

FIG. 2 is a fragmentary section taken along line II—II of FIG. 1;

FIG. 3 is an enlarged detail, partly in section, of a portion of FIG. 1; and

Figure 1:
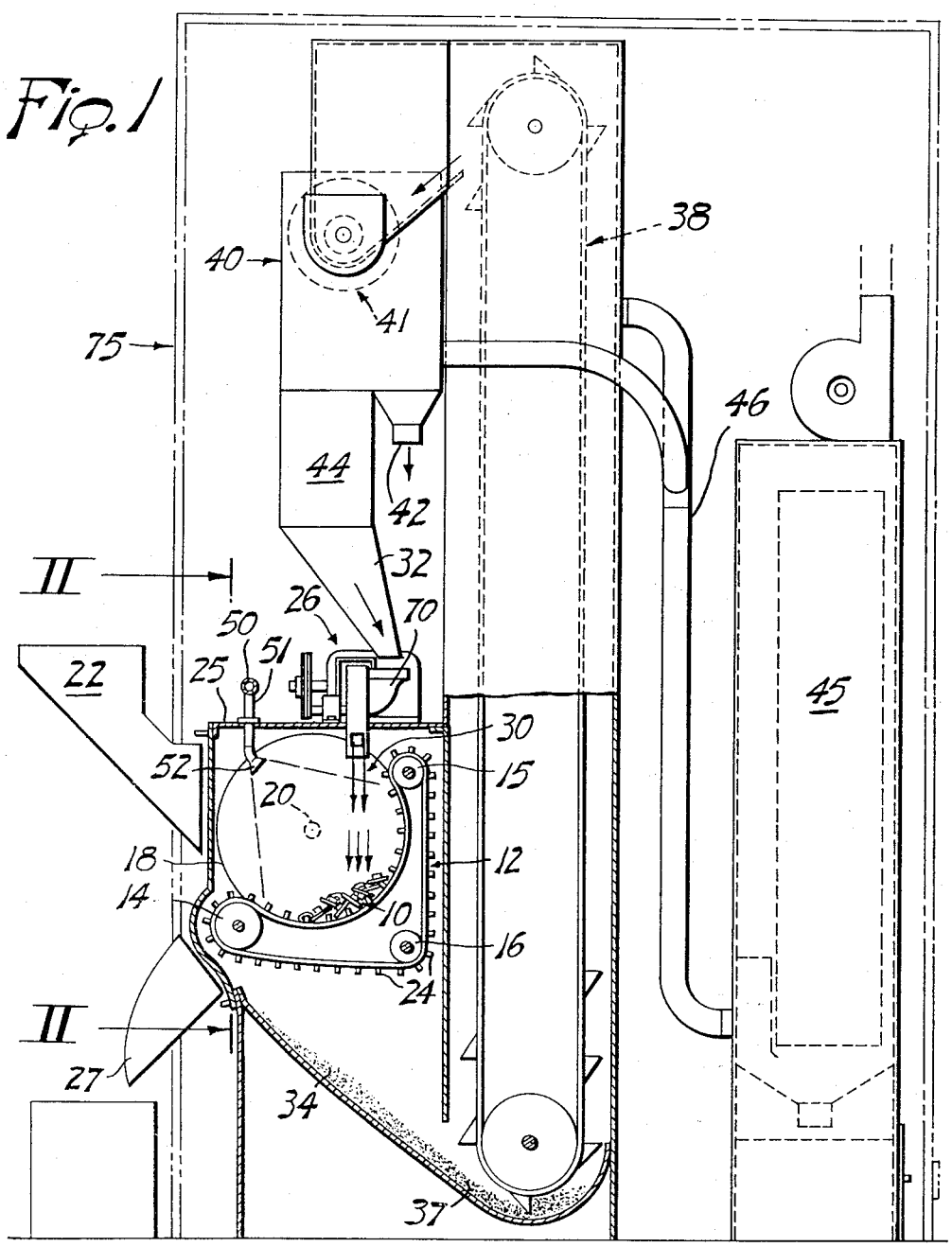
FIG. 1 is a schematic illustration, in the form of a composite elevational-sectional view, of an apparatus constructed in accord with the present invention.

FIG. 4 schematically illustrates a mode of operation of the invention upon a typically shaped workpiece.

As shown in the accompanying drawing, the apparatus is arranged to perform definning or deflashing operations upon batches of molded rubber articles such as are indicated generally in FIG. 1 at 10. A sectional view on an enlarged scale, of a typical workpiece is also shown at FIG. 4. The workpieces are shown herein as being supported upon an endless apron type conveyor designated generally at 12, which is in the form of an endless belt training around pulleys or rollers 14, 16, and a driven pulley or sprockets 15, and so arranged that the upper strand of the conveyor device trains under and behind a pair of spaced "barrel heads" 18—18 which are carried on shafts 20—20. Thus, as the barrel heads rotate, the endless belt is guided thereby in its travel, thus causing it to assume a pocket type formation into which the workpieces 10 are cradled. This conveyor is of the type disclosed for example in U.S. Patents 1,567,077; 1,882,443; and 2,104,055. However, it is to be understood that any other suitable type conveyor may be used in lieu thereof.

A loading chute as indicated at 22 is provided to facilitate loading of consecutive batches of workpieces into the deflashing chamber, and in normal operation the conveyor is driven so that the top strand portion thereof moves continuously inwardly and then upwardly toward the pulleys 15. Thus, in this case the workpieces are continuously drawn by the conveyor inwardly and then upwardly until such time as they gently turn over and away from the vertical climb portion. Cleats or the like as indicated at 24 are preferably provided in some cases on the conveyor to facilitate turning over of the workpieces as the conveyor operates. An unloading chute as indicated at 27 is also provided to receive the finished workpieces whenever a batch is completed and the conveyor is reversed in its direction of operation.

More specifically, the construction of the conveyor 12 may be of any preferred form, but by way of an example it may comprise a specially compounded abrasive-resistant rubber or plastic material, adapted to remain flexible under sub-zero temperature conditions. Or, it may be of an apron conveyor type, comprising articulated slats or aprons formed of metal or the like. As shown herein the conveyor device is enclosed within a housing 25 which conveniently mounts one or more abrasive media projecting machines such as are indicated generally at 26 in the drawing. The abrasive blast projecting machines may be of any suitable type, and for example may be of the type disclosed in U.S. Patent No. 2,708,814.

In any case, the blast machine or machines 26 will of course be power driven as indicated at 28 (FIG. 2) and arranged to direct by airless blast techniques, streams or patterns of steel shot or other abrasive materials, as explained hereinafter, directly downwardly into the housing 25 between the barrel heads 18—18 so as to strike against the workpieces 10 which are cradled in the conveyor device. Thus as shown in FIGS. 1, 2, 4 the blast machine or machines 26 will be arranged to throw the blast media against the workpieces in the form of patterns or streams, as indicated at 30. The blast machines 26 are arranged to be supplied continuously with blasting media, as through an abrasive storage hopper 32, as will be explained more fully hereinafter.

The workpiece support conveyor 12 is of perforate form to permit passage therethrough of spent abrasive media and small particles of fins or flashings such as have become detached from the workpieces during operation of the device. For this purpose, the conveyor device may be formed with drain holes therethrough, or may be otherwise constructed in any preferred manner so as to provide interstices through which the spent abrasive and smaller refuse parts from the operation may escape downwardly into a collection hopper 34 as shown in FIG. 1. The refuse is fed by gravity from the hopper 34 into the boot portion 37 of a bucket elevator as indicated at 38; the elevator 38 being arranged to deliver the mixture of rubber refuse and worn out abrasive and reusable abrasive media into a separator device as indicated generally at 40.

The separator mechanism may be of any preferred form, and may include a rotary screen as indicated at 41 and/or an air separator. In any case it will be arranged so as to discharge, as indicated at 42, the trash components of the feed mixture comprising non-reusable portions of the abrasive media and the rubber fins or flash particles previously removed from the workpieces. The reusable abrasive is then fed by gravity through a chute portion 44 into the abrasive storage hopper 32 which feeds the blast machine as explained hereinabove. A dust collector having its suction intake duct as indicated at 46 connected in communication with the interior of the elevator casing and with the interior of the separator casing, is provided for the purpose of constantly eliminating dust accumulations from the device, and for maintaining the atmosphere internally of the housing 25 under slightly reduced pressure from that externally thereof as contained within casing 75. This, in combination with other features to be described later, account for an improved operation as will be more fully explained hereinafter.

To freeze the workpieces any suitable arrangement may be employed. For example, the workpieces may be frozen prior to being delivered into operative position upon the conveyor as by passing them through a suitably chilled chamber, or by spraying them with a cooling fluid, or by mixing them with particles of Dry Ice, or by dipping them into a cold liquid bath, or the like. I prefer however to freeze the workpieces following delivery thereof into the machine; and in such case the freezing operation may be performed for example by mixing Dry Ice particles into the workpiece load on the conveyor, with each new batch of workpieces as delivered to the machine. However, a more satisfactory and convenient method is illustrated in the drawing herewith and comprises use of a pipe manifold as indicated at 50 which is provided with a series of branch pipes 51 carrying spray nozzles 52 projecting into the housing 25. The manifold 50 is arranged to be connected through a control valve 54 to a source of liquid carbon dioxide as iIndicated at 55 FIG. 2).

Thus, the nozzles 52 are arranged to spray expanding gas from the liquid carbon dioxide supply over the full width of the workpiece load while the latter is being rotated and turned by means of the conveyor device. Regulation of the valve 54 and of the diameters of the orifices in the nozzles 52 will of course regulate the rate of freezing of the workpieces, so as to provide optimum results as will be more evident hereinafter. Thus the device may be arranged so as to introduce into the housing 25 carbon dioxide gas which will act to quick-freeze the relatively thin flashing and fin portions of the load of workpieces rather quickly, before the thicker body portions thereof become frozen. Operation of the blast media upon the workpieces will then quickly and neatly remove the brittle fins and flashing portions, the finer particles of which filter down through the conveyor drain holes along with the spent abrasive media particles, into the collection hopper 34 as explained hereinabove. Throughout this phase of the operation the agitator bars as indicated at 24 act to cause the workpieces to slowly turn over and thus to present constantly changing facets of the workpieces to the blast operation, thereby insuring penetration of heretofore inaccessible portions of complex shaped workpieces, as explained hereinabove.

It is a particular feature of the present invention that the process thereof is operable to treat complex-shaped parts such as heretofore require individual hand processing. For example, a workpiece such as is sectionally illustrated at FIG. 4 may be readily processed in accord with the present invention, although it would be impossible or extremely difficult to satisfactorily handle it in connection with a freeze-tumble barrel type operation. In this case the relatively fragile lip portion 60 as well as flange 61 must be protected against damage while the adjacent flash portion 62 is to be removed. Similarly, the outer flash portion 64 must be removed from the workpiece without rounding off of the corners thereof. Conventional tumbling barrel operations on workpieces of this nature would result in damage to the relatively fragile flange and lip portions; and unsatisfactory and perhaps only partial removal of the objectional fin or flash portions. On the other hand in accord with the present invention, the relatively brittle, thin portions of the workpiece are attacked from a multitude of directions, due to the multiple angular pattern of media projected and rebound thereof following initial impact against the work. Thus in the case of the present invention the brittle flash portions are quickly and cleanly severed from the workpieces by a media gaining access to all surfaces thereof. At the same time, in the case of the present invention there are no damaging impacts of relatively larger abrasion particles such as wood blocks, steel diagonals, etc. as used in barrel tumbling, against the workpieces such as would deform the lip and flange portions of the workpiece as shown in FIG. 4, which are intended to remain intact.

To facilitate proper functioning of the apparatus in accord with the present invention, it will of course be understood that the housing 25 will be provided with removable inlet and outlet doorways in conjunction with the inlet and delivery chutes 22, 27, so as to normally maintain the housing in substantially air-sealed relation to maintain the temperature thereof uniformly at the desired reduced temperature. To further facilitate this phase of the operation, the abrasive media feed spout as indicated at 70 which feeds the blast machine 26, may be provided with an orifice plate as indicated at 72 (FIG. 3) which serves to meter the abrasive media to be thrown by the blast, and also serves to minimize the pumping of air through the blasting machine into the interior of the housing 25. Use of airless blast machines as indicated at 26 also contributes to the success of the system because they involve no incidental circulation of air which might interfere with efficient cooling of the workpieces.

Also, to facilitate performance of the apparatus, it is enclosed within a substantially air-tight and thermal-insulated casing as indicated generally at 75 (FIG. 1). Thus, the housing 25, the media projection machine 26, the elevator 38, the separator 40, and the dust collector unit 45 are all confined within a heat-insulated and substantially atmospheric-sealed casing. This serves to maintain a sub-ambient temperature in the area of the blast operation which operates to reduce the cooling gas consumption requirement and permits recirculation of the cold gases discharged by the dust collector. Also because the casing is kept at an internal pressure somewhat greater than the atmospheric pressure externally thereof due to the expansion of the liquid carbon dioxide through nozzles 52, moisture laden air from externally of the apparatus is prevented from gaining access thereinto. This minimizes the problem of condensation within the mill such as would otherwise be detrimental to the operation.

It will of course be appreciated that because the apparatus is preferably enclosed, as within a casing as indicated at 75, suitable access doors and observation windows or the like will be provided as needed; and that an automatic temperature control system will preferably be provided. For example, adjustable timers to regulate the workpiece loading and freezing and unloading cycles may be provided; as well as adjustable controls for automatically regulating the relative length of the freezing cycle and the conveyor operating cycle and the blast cycle. Also, remote controls for regulating the flow of carbon dioxide gas in the freezing operation, and for controlling the blasting machine r.p.m. and the mill conveyor speed, may be provided; as well as indicating devices for showing the temperatures at different parts of the apparatus.

It will of course be appreciated that selection of the abrasive media in any given case will depend upon the nature of the job to be done. Selection may be made from a wide variety of abrasive media such as steel shot, aluminum shot, soft grit, and the like. Whereas the abrasive media is shown herein as being projected into the blast chamber by means of airless type blast machine, it is to be understood that any other suitable arrangement may be employed, such as for example by entrainment of the abrasive into and projection thereof by a sub-ambient temperature gas or air stream discharging into the blast chamber. By virtue of the method and apparatus of the present invention the technique of freeze-deflashing of rubber parts may be greatly expanded and adapted with satisfaction and economy to the processing of many workpieces such as heretofore were necessarily processed only by hand methods. Also, it will of course be appreciated that whereas only one specific form of apparatus of the invention has been illustrated and described in detail, various changes may be made therein without departing from the spirit of the invention or the scope of the following claims.

I claim:

1. A method for deflashing or trimming molded rubber parts, said method comprising freezing the flash portions of said parts to a condition of embrittlement, and then subjecting the parts to an airless abrasive media blast operation from directions constantly varying angularly with respect to the parts, collecting refuse from the operation comprising a mixture of detached rubber flash debris and spent blast media, separating said refuse and segregating therefrom the reusable blast media and returning the latter to the operation for reuse.

2. An apparatus for definning or deflashing or trimming molded rubber parts or the like, said apparatus including a housing and means for projecting an airless stream of blast media particles into said housing, means for supporting a plurality of workpieces interiorly of said housing while continuously turning them to present different facets thereof to the blast media projection stream, means for reducing the temperature of the workpieces so that the relatively thin portions thereof become embrittled, means collecting from the operation a refuse comprising a mixture of removed rubber parts and spent media, means separating from said mixture the reusable portion of the blast media included therein and returning the same again to said blast projection machine, a dust collector having an inlet in communication with a housing enclosing the blasting operation and the separation operation, and gate means regulating recirculation of the cooled air through the blasting housing.

3. A method for deflashing or trimming molded rubber parts, said method comprising freezing the flash portions of said parts to a condition of embrittlement, and then subjecting the parts to an airless abrasive media blast, collecting refuse from the operation comprising a mixture of detached rubber flash debris and spent blast media, separating said refuse and segregating therefrom the reusable blast media and returning the latter to the operation for reuse.

4. An apparatus for definning or deflashing or trimming molded rubber parts or the like, said apparatus including a housing and means for projecting an airless stream of blast media particles into said housing, means for supporting a plurality of workpieces interiorly of said housing, means for reducing the temperature of the workpieces so that the relatively thin portions thereof become embrittled, means collecting from the operation a refuse comprising a mixture of removed rubber parts and spent media, means separating from said mixture the reusable portion of the blast media included therein and returning the same again to said blast projection machine, and a dust collector having an inlet in communication with a housing enclosing the blasting operation and the separation operation.

5. A method for deflashing or trimming molded rubber parts, said method comprising freezing the flash portions of said parts to a condition of embrittlement, and then subjecting the parts to an airless abrasive media blast operation from directions constantly varying angularly with respect to the parts.

6. An apparatus for definning or deflashing or trimming molded rubber parts or the like, said apparatus including a housing and means for centrifugally projecting an airless stream of blast media particles into said housing, means for supporting a plurality of workpieces interiorly of said housing while continuously turning them to present different facets thereof to the blast media projection stream, and means for reducing the temperature of the workpieces so that the relatively thin portions thereof become embrittled.

7. A method for deflashing or trimming molded rubber parts, said method comprising freezing the flash portions of said parts to a condition of embrittlement, and then subjecting the parts to an airless abrasive media blast operation while constantly turning the parts, collecting refuse from the operation comprising a mixture of detached rubber flash debris and spent blast media, separating said refuse and segregating therefrom the reusable blast media and returning the latter to the operation for reuse.

8. An apparatus for definning or deflashing or trimming molded rubber parts or the like, said apparatus including a housing and means for projecting an airless stream of blast media particles into said housing, means for supporting a plurality of workpieces interiorly of said housing while continuously turning them to present different facets thereof to the blast media projection stream, means for reducing the temperature of the workpieces so that the relatively thin portions thereof become embrittled, a dust collector having an inlet in communication with a casing enclosing the blasting operation and the separation operation, and gate means regulating recirculation of the cooled air through the blasting housing.

9. A method for deflashing or trimming molded rubber parts, said method comprising freezing the flash portions of said parts to a condition of embrittlement, and then subjecting the parts to an airless barrage of abrasive projectiles moving at velocities sufficient to sever the flash portions from the workpieces when in impact therewith, collecting refuse from the operation comprising a mixture of detached rubber flash debris and spent blast media, separating said refuse and segregating therefrom the reusable blast media and returning the latter to the operation for reuse.

10. An apparatus for definning or deflashing or trimming molded rubber parts or the like, said apparatus including a housing and means for projecting an airless barrage of blast media particles into said housing, means for supporting a plurality of workpieces interiorly of said housing while continuously turning them to present different facets thereof to the blast media barrage, means for reducing the temperature of the workpieces so that the relatively thin portions thereof become embrittled, means collecting from the operation a refuse comprising a mixture of removed rubber parts and spent media, and means separating from said mixture the reusable portion of the blast media included therein and returning the same again to said blast projection machine.

11. A method for deflashing or trimming molded rubber parts, said method comprising treating the flash portions of said parts to assume a condition of embrittlement, and then subjecting the parts to an airless abrasive media barrage, collecting the refuse from the operation, separating said refuse and segregating therefrom the reusable blast media and returning the latter to the operation for reuse.

12. An apparatus for definning or deflashing or trimming molded rubber parts or the like, said apparatus including a housing and means for projecting a barrage of blast media particles into said housing, means for supporting a plurality of workpieces interiorly of said housing while continuously turning them to present different facets thereof to the blast media barrage, means for treating the workpieces so that the relatively thin portions thereof become embrittled, and means separating from the refuse of the operation the reusable portion of the blast media included therein and returning the same again to said blast projection machine.

References Cited in the file of this patent
UNITED STATES PATENTS

| | | |
|---|---|---|
| 2,305,451 | Turnbull | Dec. 15, 1942 |
| 2,424,955 | Potter | July 29, 1947 |
| 2,682,732 | Hanrahan | July 6, 1954 |